(12) United States Patent
Kanematsu et al.

(10) Patent No.: US 8,630,017 B2
(45) Date of Patent: Jan. 14, 2014

(54) INK JET PRINTING APPARATUS THAT IDENTIFIES A REGION ADJACENT TO A CHARACTER FOR A THINNING OPERATION

(75) Inventors: Daigoro Kanematsu, Yokohama (JP);
Mitsutoshi Nagamura, Tokyo (JP);
Tomomi Furuichi, Yokohama (JP);
Masaharu Shimakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 11/737,920

(22) Filed: Apr. 20, 2007

(65) Prior Publication Data
US 2007/0247649 A1  Oct. 25, 2007

(30) Foreign Application Priority Data

Apr. 24, 2006 (JP) ................................. 2006-119646

(51) Int. Cl.
*G06F 15/00* (2006.01)
(52) U.S. Cl.
USPC ............ 358/1.9; 358/3.27; 358/2.1; 358/3.1; 358/3.26; 358/502; 347/14; 347/19; 347/40; 382/258; 382/259; 382/266; 382/267; 382/268; 382/269; 382/274

(58) Field of Classification Search
USPC .......... 347/14, 19, 40; 358/1.9, 2.1, 3.1, 3.26, 358/3.27, 502; 382/258, 259, 266–269, 274
See application file for complete search history.

(56) References Cited

U.S. PATENT DOCUMENTS

| | | | |
|---|---|---|---|
| 5,867,172 A * | 2/1999 | Fujisawa et al. | 345/467 |
| 5,975,673 A | 11/1999 | Ohtsuka et al. | |
| 5,992,971 A * | 11/1999 | Takahashi et al. | 347/43 |
| 6,567,544 B1 * | 5/2003 | Kanno et al. | 382/169 |
| 7,221,480 B2 * | 5/2007 | Hirayama | 358/1.9 |
| 7,775,618 B2 * | 8/2010 | Shimakawa et al. | 347/15 |
| 2005/0105820 A1 * | 5/2005 | Zhou et al. | 382/266 |
| 2005/0219575 A1 * | 10/2005 | Kanematsu et al. | 358/1.9 |
| 2007/0008556 A1 * | 1/2007 | Kagawa et al. | 358/1.9 |
| 2007/0153046 A1 | 7/2007 | Kanematsu et al. | |

FOREIGN PATENT DOCUMENTS

| | | |
|---|---|---|
| JP | 55-65269 | 5/1980 |
| JP | 4-259576 | 9/1992 |
| JP | 8-300638 | 11/1996 |
| JP | 2000-094750 | 4/2000 |
| JP | 2000-177151 | 6/2000 |
| JP | 2002041025 A * | 2/2002 |
| JP | 2003-220717 | 8/2003 |
| JP | 2005-169753 | 6/2005 |

* cited by examiner

*Primary Examiner* — Benjamin O Dulaney
(74) *Attorney, Agent, or Firm* — Fitzpatrick, Cella, Harper & Scinto

(57) ABSTRACT

An ink jet printing apparatus that improves the visibility of a character and its background in different colors or of outline characters is provided. Specifically, outline character bold data is inverted and each of the pixels in the data is expanded to adjacent eight pixels. Then, the expanded outline character is processed into expanded inverted data. The logical AND of the inverted expanded data and K data on a background image is then calculated to generate K data with the outline character expanded. This results in an image with the outline character expanded. That is, the present invention enables characters with improved visibility and free from blurredness to be printed while preventing the adverse effect of bleeding on the outline character.

29 Claims, 10 Drawing Sheets

OUTLINE CHARACTER BOLD DATA

INVERTED EXPANDED DATA

OUTLINE CHARACTER
BOLD DATA

FIG.8A

3 X 3 EXPANDED
PIXEL DATA

FIG.8B

5 X 5 EXPANDED
PIXEL DATA

FIG.8C

7 X 7 EXPANDED
PIXEL DATA

FIG.8D

INVERTED OUTLINE
CHARACTER BOLD DATA

FIG.8E

THINNING MASK
1 FOR K

FIG.8F

THINNING MASK
2 FOR K

FIG.8G

THINNING MASK
3 FOR K

FIG.8H

DATA OF K

FIG.8K

THINNING DATA FOR K

FIG.8I

PRINTING DATA OF K

FIG.10A
CHARACTER DATA OF K

FIG.10B
DATA OF Y

FIG.10C
THINNING DATA FOR Y

FIG.10D
CHARACTER DATA OF C

FIG.10E
DATA OF Y

FIG.10F
THINNING DATA FOR Y

INK JET PRINTING APPARATUS THAT IDENTIFIES A REGION ADJACENT TO A CHARACTER FOR A THINNING OPERATION

BACKGROUND OF THE INVENTION

1. Field of the Invention

The present invention relates to ink jet printing apparatuses and image processing methods, and specifically, to a technique for reducing, in an image containing a character and its background, the blurredness and bleeding of characters.

2. Description of the Related Art

Ink jet printing apparatuses, which can perform printing to various print media, have the advantage of being able to perform dense and fast printing and have thus been used as information output devices for various apparatuses. These devices have been commercialized as printers, portable printers, and copiers.

What is called a serial type of an ink jet printing apparatus comprises a carriage mounting a print head having a plurality of ink ejection openings and an ink tank, a conveying mechanism that conveys a print medium, and control means for controlling the operation of the carriage and the conveying mechanism. This ink jet printing apparatus performs scans of the print head in a direction (main scanning direction) orthogonal to the direction of conveyance of a print medium (sub-scanning direction). Between these scans, the print medium is conveyed by an amount equal to a print width of printing. This ink jet printing system performs printing by ejecting ink to the print medium in accordance with print signals. The ink jet printing system is widely used, owing to its low running costs and quiet operations. In recent years, many products use a plurality of colors of ink so as to be adaptable to color printing.

On these color ink jet apparatuses, it is known that in an image composed of a character and its background, the character may become blurred or have bleeding. More specifically, first, in an image in which the character and its background are composed of different colors from each other, the inks of the different colors may bleed and mix with each other at the boundary between the character and background. This may degrade the visibility of the character. Second, in an image composed of an outline character against a colored background, the background color ink may bleed into the outline character area to blur the outline character, degrading their visibility.

Measures described below have been proposed to deal with the above problems.

A first measure is to provide a fixing mechanism such as a heating fixing device. This allows ink to be quickly fixed to a print medium to prevent bleeding, improving the visibility of characters. As a second measure, a proposal has been made of a method of detecting the boundary between a black image and a color image and applying a color ink on the black ink adjacent to the boundary so that the high permeability of the color ink serves to reduce possible boundary bleeding (see Japanese Patent Laid-Open No. 2005-169753). As a third measure, a technique is known which increases the permeability of inks through the print medium to prevent different inks from mixing together on the surface of the print medium (see Japanese Patent Laid-Open No. 55-65269 (1980)).

However, these methods have problems as described below.

On the first measure, the provision of the fixing mechanism may draw an increase of size and cost of the apparatus. Further, the serial type printer conveys the print medium for each scan, resulting in intermittent sheet conveying. Thus, uneven fixation may occur following the intermittent sheet conveying. Further, on the second measure in which the color ink is applied on the black ink adjacent to the boundary to reduce bleeding, in many cases, sufficient effects are not expected unless the black ink and the color ink have the properties of reacting with each other.

The third measure can prevent the different inks from mixing together on the print medium by increasing their permeability. However, increasing permeability may cause the inks to permeate a shallow layer in the print medium along its surface and move across the boundary. In particular, if an outline character is printed, such bleeding may degrade the visibility of the character.

SUMMARY OF THE INVENTION

An object of the present invention is to provide an ink jet printing apparatus and an image processing method which are able to improve the visibility of a character and its background in different colors or the visibility of outline characters.

In the first aspect of the present invention, there is provided an ink jet printing apparatus that prints an image including a character by using a print head to eject ink to a print medium from the print head, said apparatus comprising: character identifying means for identifying character data in image data; thinning means for executing a thinning process for an adjacent portion in the image data, which portion is composed of predetermined pixels of the image data adjacent to the character, based on the identified character data; and print control means for causing said printing apparatus to print the image including the character based on an image data including the character data and the adjacent image data which is subjected to the thinning process by said thinning means.

In the second aspect of the present invention, there is provided an image processing method of generating print data used for printing an image including a character by using a print head to eject ink to a print medium from the print head, said method comprising: a character identifying step of identifying character data in image data; a thinning step of executing a thinning process for an adjacent portion in the image data, which portion is composed of predetermined pixels of the image data adjacent to the character, based on the identified character data; and a generating step for generating an image data including the character data and the adjacent image data which is subjected to the thinning process by said thinning step.

According to the above configuration, an image adjacent to an identified character is thinned out so that a space between the character and the adjacent image is formed. Thus, bleeding ink can be confined within the space. This reduces blurredness of outline characters and bleeding of ink at the boundary between a black character and a background color or between a colored character and a background color. Thus, the visibility of characters can be improved.

Further features of the present invention will become apparent from the following description of exemplary embodiments (with reference to the attached drawings).

DESCRIPTION OF THE EMBODIMENTS

Embodiments of the present invention will be described below with reference to the drawings. In the embodiments described below, an ink jet printer will be described as an example of an ink jet printing apparatus.

Outline of the Ink Jet Printer

Figure 1:
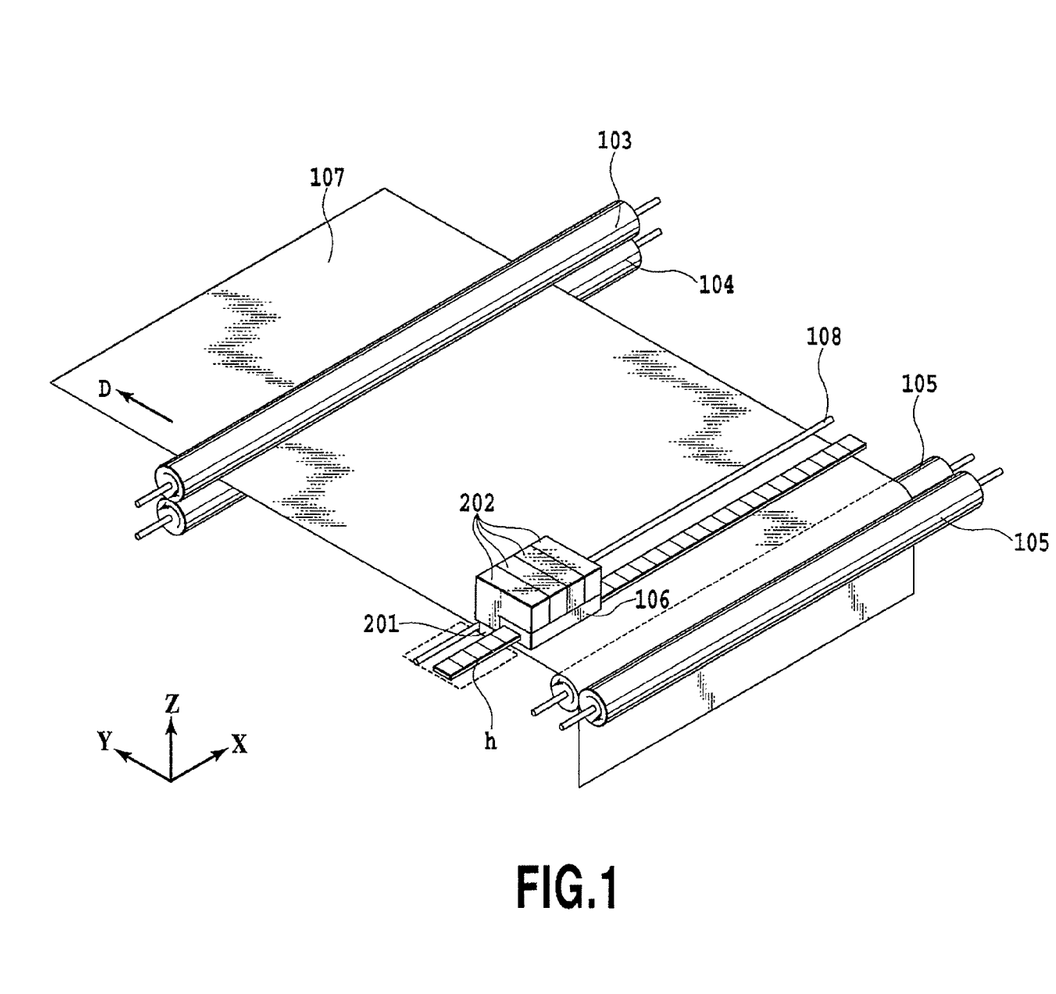
FIG. 1 is a perspective view schematically showing the configuration of a color ink jet printer in accordance with an embodiment of the present invention.

FIG. 1 is a perspective view schematically showing a color ink jet printer in accordance with an embodiment of the present invention. In this figure, reference numeral 202 denotes ink cartridges that store color inks in cyan, magenta, yellow and a black ink, respectively. The ink cartridges 202 are removably mounted on the carriage 106. Print heads 201 corresponding to the respective inks are also removably mounted on the carriage 106. The carriage 106 can move while being guided along a guide shaft 108 by a driving mechanism (not shown). This allows the print heads 201 to scan a print medium 107 such as a print sheet for printing. Reference numeral 104 denotes a sheet feeding roller that rotates with an auxiliary roller 103 (desirably in spur form) in the direction of an arrow in the figure. Similarly, a sheet feeding roller pair 105 is provided upstream of the print heads 201 in the direction of conveyance of the print medium 107. The sheet feeding roller pair 105 rotates in synchronism with the conveying roller 104. This allows the print medium to be conveyed in a direction shown by arrow D in the figure with a print surface of the print medium 107 kept flat.

In response to a print instruction, the carriage 106 moves in an x direction in the figure to execute scanning with the print heads. During the scanning, ejection heaters in the print heads 201 are driven to eject the corresponding inks in accordance with the print data. An area on the print medium 107 is thus printed which corresponds to the print width of the print heads. After the print scan is finished and before the next print scan is started, the sheet feeding roller 104 feeds the sheet by a distance equal to the required width in the direction of arrow D in the figure. The scanning and sheet feeding operations are thus repeated to complete printing the predetermined area in the print medium.

Instead of being executed only during the main scan in one direction, printing may also be executed during a return, that is, while the carriage is returning to its home position after the main scan printing in the x direction, in order to increase print speed. Further, in the example described above, the ink tanks and the print heads are detachably mounted on the carriage 106. However, an ink jet cartridge form may be used in which the ink cartridges 202, accommodating the respective inks, are integrated with the print heads 201. Moreover, a multi-color integrated print head may be used which can eject a plurality of color inks.

A capping mechanism (not shown) and a recovery unit (not shown) are provided within the range of movement of the carriage; the capping mechanism caps ejection opening surfaces of the print heads, and the recovery unit performs a head recovering operation of, for example, removing ink with an increased viscosity or bubbles from the print heads capped by the capping mechanism. The recovery unit has, for example, a cleaning blade (not shown) supported so that the blade can project toward the print heads 201 and abut against their front surfaces. Thus, after a recovery operation, the cleaning blade is projected into a path of movement of the print heads to wipe unwanted ink droplets, dirt, and the like off from the front surfaces of the print heads as the print heads move.

Outline of the Print Heads

Figure 2:
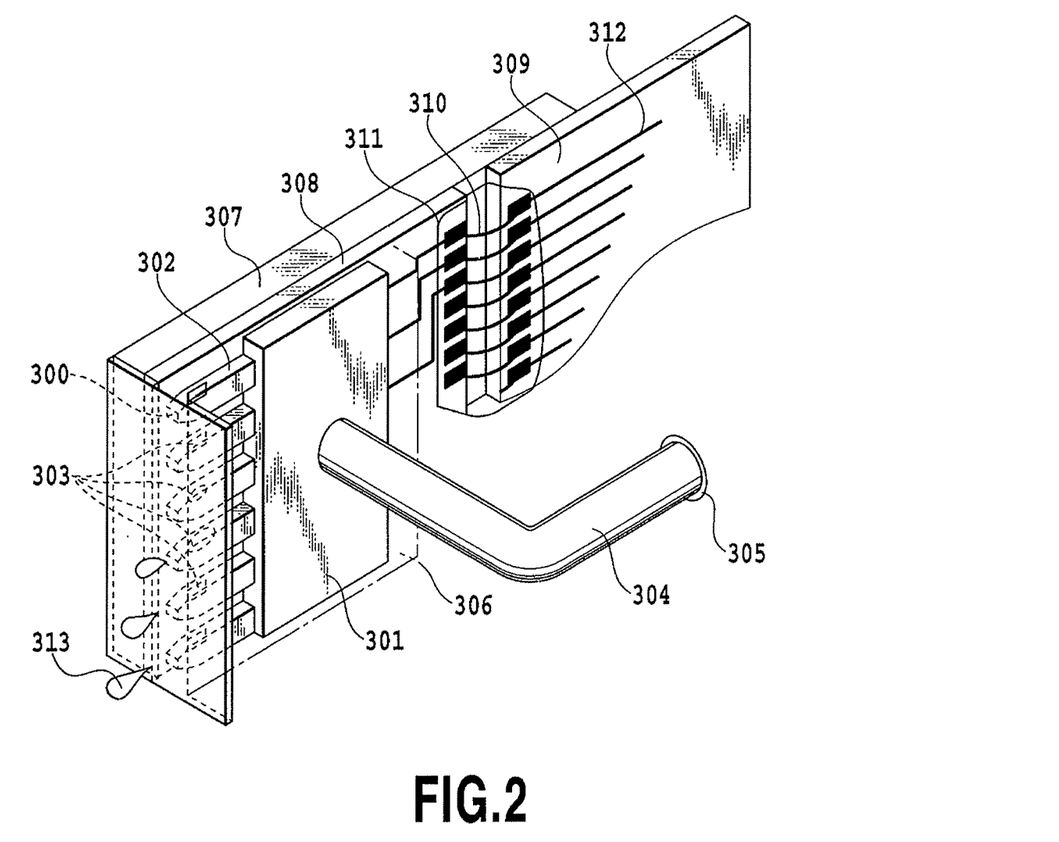
FIG. 2 is a perspective view schematically showing the configuration of an essential part of a print head 201 shown in FIG. 2.

FIG. 2 is a perspective view schematically showing the configuration of essential part of the print heads 201, shown in FIG. 1. As shown in FIG. 2, each of the print heads 201 has a plurality of ejection openings 300 formed therein at a predetermined pitch, a common liquid chamber 301, channels 302 that couple the common liquid chamber 301 to the ejection openings 300, and ejection heaters 303 each disposed along a wall surface of the corresponding channel 302 to generate ejection energy. The heaters 300 and their circuits are formed utilizing a semiconductor fabricating technique. The channels 302 and common liquid chamber 301 are formed of a plastic cover 306 created by injection molding. Temperature sensors (not shown) and sub-heaters (not shown) are also formed on the same silicon at a time during the same semiconductor fabricating process. A silicon plate 308 having these electric wires is fixed to an aluminum base plate 307 constituting a support substrate. A circuit connection portion 311 on the silicon plate 308 is electrically connected to a printed circuit board 309 through very thin wires 310. The circuit connection portion 307 and printed circuit board 309 can receive signals from the printing apparatus main body via signal circuits 312. The common liquid chamber 301 is coupled to the ink cartridge shown in FIG. 1 via a joint pipe 304 with an ink filter 305. This allows inks to be fed from the ink cartridge to the common liquid chamber 301. The fed inks are temporarily stored in the common liquid chamber and then fed to the channels 302. The inks form meniscuses at the ejection openings 300 as a result of a capillary phenomenon to keep filling the channels 302. Then, the heaters 303 are energized via electrodes (not shown) to generate heat. The inks on the heaters 303 are thus rapidly heated to generate bubbles in the channels 302. The bubbles then expand to eject ink droplets 313 from the ejection openings 300.

Outline of the Control Configuration

Figure 3:
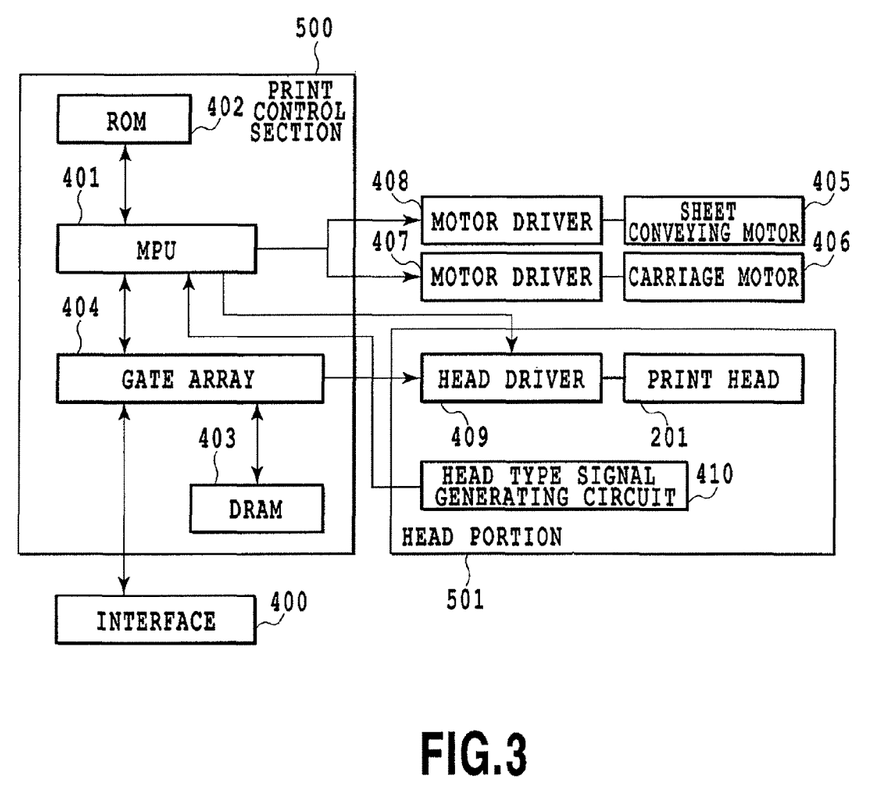
FIG. 3 is a block diagram showing a control configuration in the ink jet printer in accordance with the embodiment shown in FIG. 1.

FIG. 3 is a block diagram showing a control configuration in the ink jet printer in accordance with the embodiment shown in FIG. 1. In the figure, reference numeral 400 denotes an interface that inputs print data from a host apparatus such as a personal computer (PC) to the ink jet printer. A print control section 500 executes a process of thinning of print data, which is inputted via the interface, as described with reference to FIG. 4 and subsequent figures, and other processes for finally obtaining data in a form supplied to a print head portion 501. The print control section 500 controls the operation of operating mechanisms for the respective portions such as a sheet feeding motor 405 and a carriage motor 406 in association with printing operations.

An MPU 401 in the print control section 500 controls the data thinning process and printing operation in accordance with control programs stored in a program ROM 402. A RAM (DRAM) 403 is used as a work area in which the MPU 401 executes these processes. That is, the RAM 403 temporarily stores print data, ejection data supplied to the print heads, and other data. The RAM 403 also memorizes the number of print dots, the number of times the print heads have been replaced with new ones, and the like. A gate array 404 controls the supply of print data to the print heads and the transfer of data between the interface 400 and MPU 401 and DRAM 403. Motor drivers 407 and 408 drive a conveyance motor 405 and a carrier motor 406, respectively. A head driver 409 drives the print heads 201 to eject inks from the ejection openings.

Description will be given for several embodiments of a process for preventing the visibility of printed characters from decreasing, which process is executed in the ink jet printer configured as described above.

Embodiment 1

A first embodiment of the present invention relates to performing a thinning-out process for a background color image data adjacent to an outline character of an image composed of the outline character and the background color. This prevents the outline character from being blurred with bleeding of the background color ink.

Figure 4:
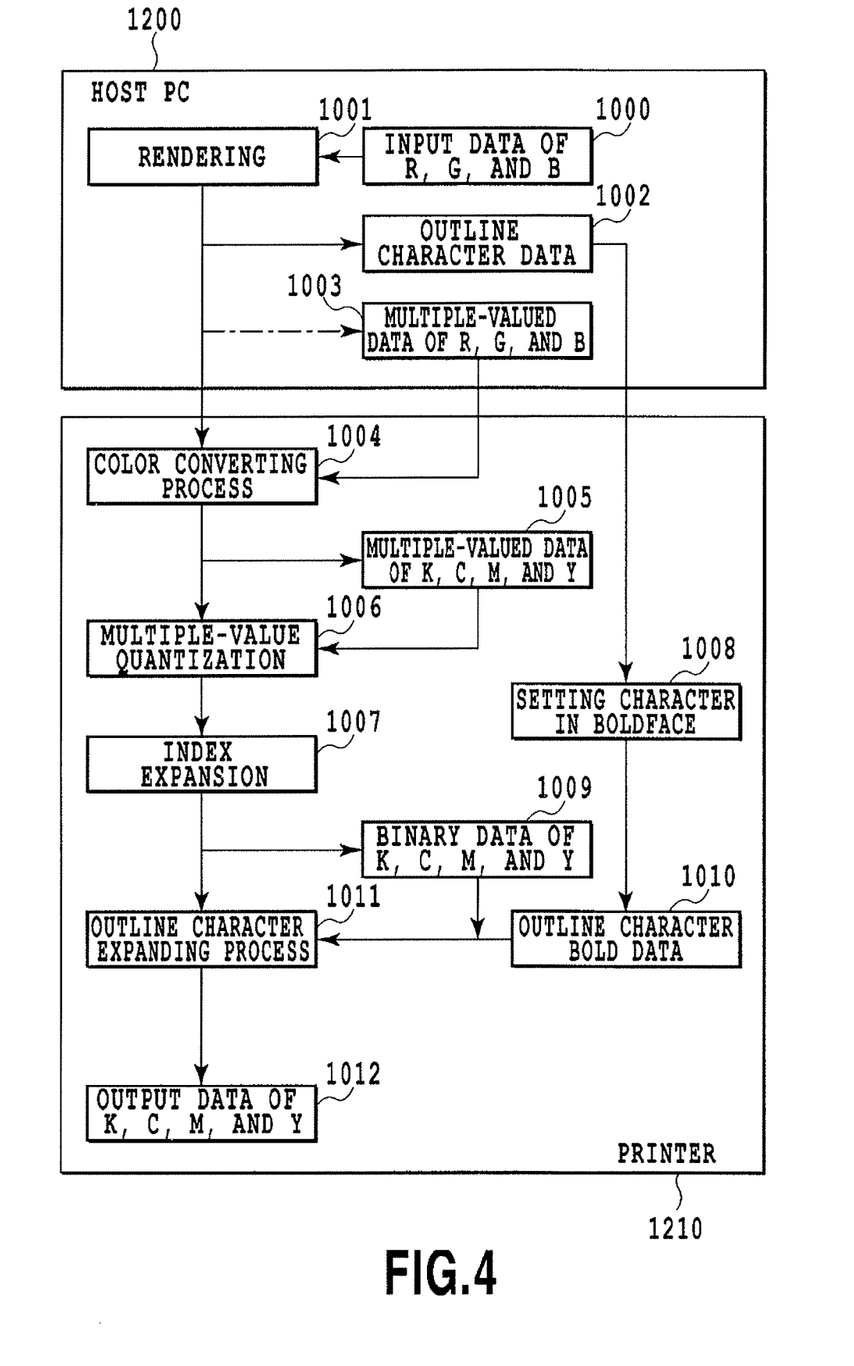
FIG. 4 is a block diagram illustrating the configuration of an outline character expanding process in accordance with a first embodiment of the present invention.

FIG. 4 is a block diagram illustrating the configuration of an outline character expanding process in accordance with a first embodiment of the present invention. A printer 1210 shown in FIG. 4 corresponds substantially to a print control section 500 in the configuration schematically shown in FIG. 3. A personal computer as a host apparatus 1200 shown in FIG. 4 (hereinafter also referred to as a host PC) is not shown in FIG. 3 and transmits and receives data, which is described below, to and from a printer 1210 via an interface 400 in FIG. 3.

The host PC 1200 executes a rendering process (1001) on input RGB data 1000 received from an application at a resolution of 600 dpi. This results in generation of multiple-valued (in the present embodiment, 256 values) RGB data 1003. The host PC 1200 also identifies outline character objects in the input RGB data 1000 and executes a rendering process 1001 on the data 1000 to generate binary outline character data 1002 with a resolution of 600 dpi. The generated multiple-valued RGB data 1003 and binary outline character data 1002 are transferred to the printer 1210.

The printer 1210 executes a color converting process 1004 by which the multiple-valued RGB data is converted into multiple-valued KCMY data. The KCMY data 1005 obtained by the color converting is subjected to a quantizing process 1006 based on a predetermined quantizing method. The present embodiment quantizes the KCMY data into five valued data with a resolution of 600 dpi by means of an error diffusion method. The KCMY data obtained by the quantization is subjected to an index expansion process (1007) to be 1200-dpi binary data 1009, which can be printed with a print head. The index expansion process uses dot arrangement data in a form of matrix, which corresponds each of the 5-valued data, to output a dot arrangement pattern corresponding to the 5-valued data. The present embodiment expands 5-value data into a 2×2 dot matrix.

On the other hand, in order to match the resolution of the outline character data 1002 with that of the print data, the printer 1210 executes a bold process 1008 on the outline character data 1010 to generate outline character bold data 1010. The bold process is what thickens the data to four vertically and horizontally adjacent pixels to change the resolution from 600 dpi to 1,200 dpi.

Finally, an outline character expanding process 1011 is executed on the basis of the binary data 1009 obtained by the index expansion and the outline character bold data 1010. Final output data 1012 is thus generated.

The present embodiment assigns the entire image data process to the host PC and printer. However, the present invention is not limited to this aspect. For example, either the printer or host PC may execute all of the process shown in FIG. 4. Essentially, the optimum assignment is desirably performed depending on the configuration of the print system.

Outline Character Expanding Process

Figure 5:
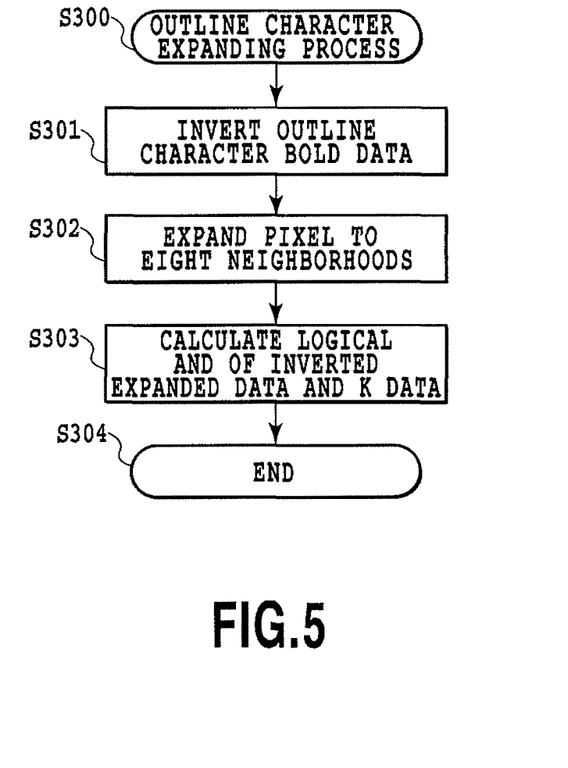
FIG. 5 is a flowchart showing the details of the outline character expanding process.

FIG. 5 is a flowchart showing the details of the outline character expanding process 1011. FIGS. 6A to 6D are diagrams showing data generated in the sequential steps of the outline character expanding process.

When the process (S300) is started, first an inverting process is executed on the outline character bold data 1011 (S301). The outline character bold data is expressed as black (data "1") pixels shown in FIG. 6A. In the figure, the character is expressed as a "square" for simplifying illustration and description. The inverting process is thus executed on this outline character bold data. This allows the outline character to be expressed as a white (data "0") pixels.

Then, expansion is performed on each of the pixels of the inverted outline character (data "0") so as to change eight adjacent pixels (that is, the pixels immediately above and below, to the right and left of, obliquely right and left above, and obliquely right and left below each pixel) into outline character pixels (data "0") (S302). The expanded inverted outline character data is shown in FIG. 6B.

Figure 6A:
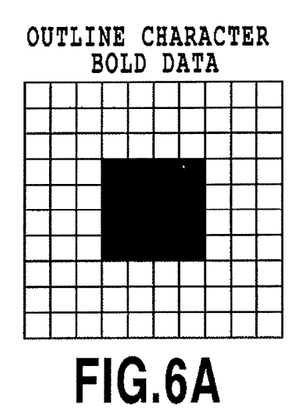
FIGS. 6A to 6D are diagrams showing data generated in sequential steps of the outline character expanding process.
Figure 6B:
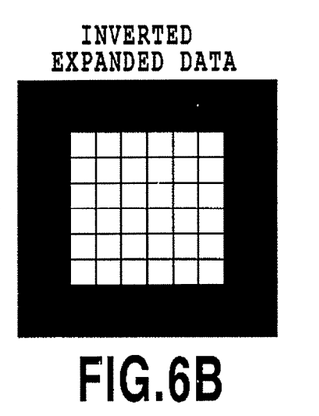
Figure 6C:
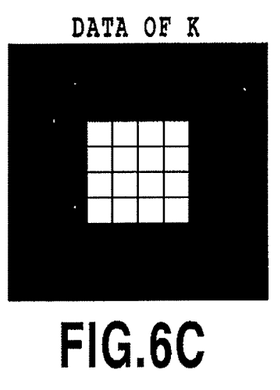
Figure 6D:
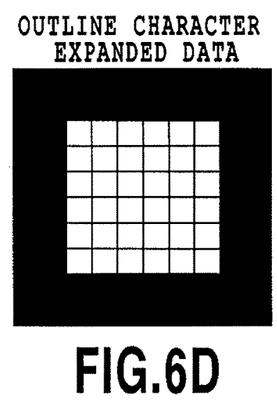

Further, the logical AND (logical product) operation of the inverted expanded data shown in FIGS. 6B and K data in a background image shown in FIG. 6C is executed (S303). This results in K data with the outline character expanded as shown in FIG. 6D. In other words, the expanded data corresponds to the K data with eight pixels adjacent to the outline character being thinned out at a rate of 100%.

The process in step 303 is executed on each of the C, M, and Y data in the background image so as to generate the outline character expanded data for each of C, M, and Y.

An image with the outline character expanded can be obtained by performing printing on the basis of the C, M, Y, and K data (1012) obtained by the above process. Thus, even if ink used to print the background image bleeds into the area of the outline character, the bleeding ink can be confined within the expanded portion, with the intended outline character area unaffected. This prevents the outline character from being blurred to improve its visibility.

Embodiment 2

A second embodiment of the present invention relates to a configuration that not only executes an outline character expanding process for thinning a background image but also sets the details of the thinning out process finely so as to prevent the fineness of the background image from being degraded by excessive thinning. Further, the second embodiment performs the optimum thinning depending on the manner in which each color ink bleeds to print higher-quality outline characters.

The present embodiment uses a configuration similar to that in accordance with the first embodiment, shown in FIG. 4, to execute a process of generating printing output data, including an outline character expanding process. The difference from the first embodiment is the configuration for the outline character expanding process (1011) as described below.

Outline Character Expanding Process

Figure 7:
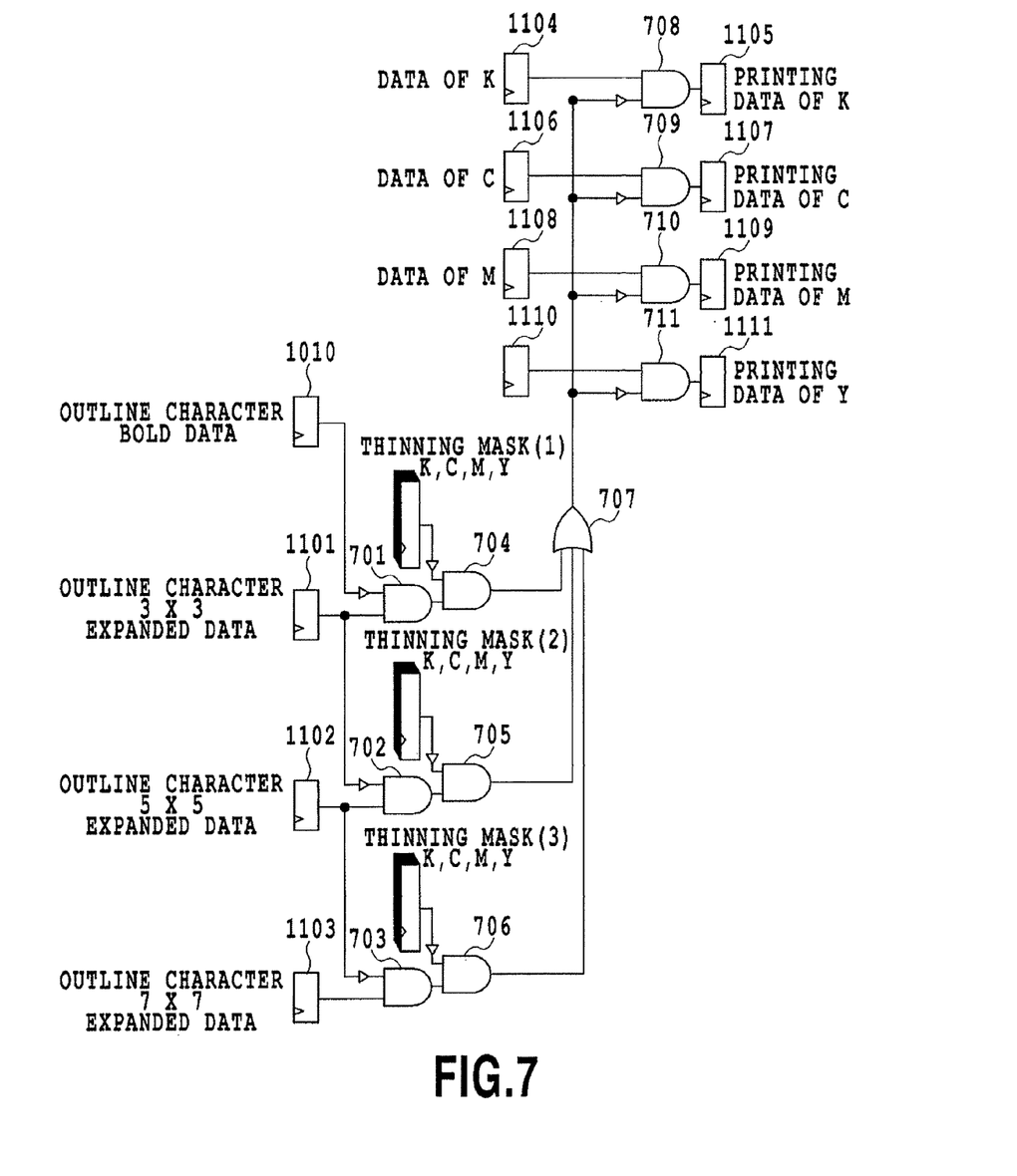
FIG. 7 is a block diagram showing the configuration of an outline character expanding process in accordance with a second embodiment of the present invention.

FIG. 7 is a block diagram showing the configuration of an outline character expanding process in accordance with the present embodiment. FIGS. 8A to 8K are diagrams showing data generated in the respective sequential steps of the outline character expanding process in accordance with the present embodiment.

The outline character expanding process in accordance with the present embodiment expands each of the pixels (black pixels; data "1") in the outline character bold data 1010 (FIG. 8A) to eight adjacent pixels to generate outline character 3×3 expanded data (1101). Further, each of the pixels in the outline character 3×3 expanded data (1101) is expanded to eight adjacent pixels to generate outline character 5×5 expanded data (1102). A similar process is repeated to generate outline character 7×7 expanded data (1103).

Figure 8A:
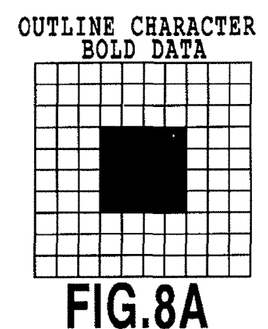
FIGS. 8A to 8K are diagrams showing data generated in sequential steps of the outline character expanding process in accordance with the second embodiment of the present invention.
Figure 8B:
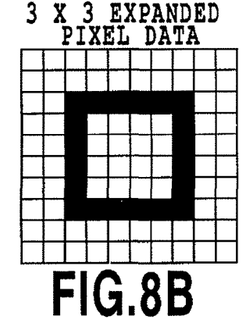
Figure 8C:
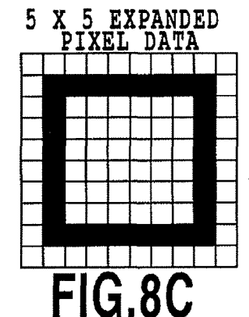
Figure 8D:
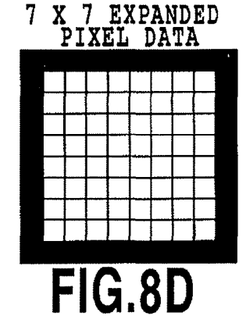
Figure 8E:
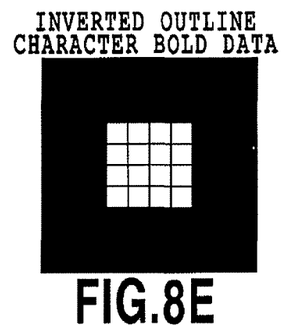

A calculation is then made of logical AND 701 of the resulting outline character 3×3 expanded data (1101) and data obtained by inverting the outline character bold data (1010) (FIG. 8E). This results in generation of 3×3 expanded pixel data shown in FIG. 8B. Then, the logical AND 704 of the 3×3 expanded pixel data and K thinning mask (1) (FIG. 8F) is calculated.

Similarly, a calculation is made of logical AND 702 of data obtained by inverting the outline character 3×3 expanded data (1101) and the outline character 5×5 expanded data (1102) to generate 5×5 expanded pixel data shown in FIG. 8C. Then, the logical AND 705 of the 5×5 expanded pixel data and K thinning mask (2) (FIG. 8G) is calculated.

Further, a calculation is made of logical AND 703 of data obtained by inverting the outline character 5×5 expanded data (1102) and the outline character 7×7 expanded data (1103) to generate 7×7 expanded pixel data shown in FIG. 8D. Then, the logical AND 706 of the 7×7 expanded pixel data and K thinning mask (3) (FIG. 8H).

Figure 8F:
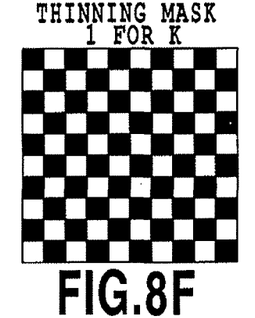
Figure 8G:
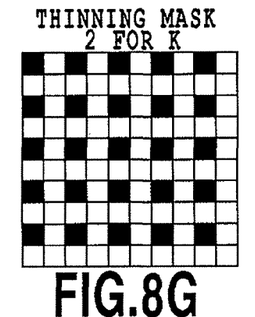
Figure 8H:
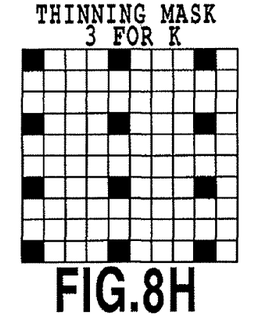
Figure 8I:
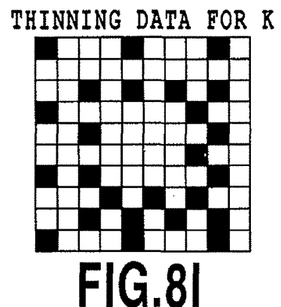

Then, the logical OR (logical sum) 707 of the logical ANDs 704, 705, and 706 is calculated to generate K thinning data shown in FIG. 8I.

In the K thinning masks (1), (2) and (3), shown in FIGS. 8F, 8G and 8H, black pixels are pixels by which data corresponding to that pixels is thinned out. As seen in the figures, thinning ratios decrease in the order of the K thinning masks (1), (2), and (3). That is, the thinning ratios decrease from the pixels located closest to the outermost outline (contour) of the outline character toward those located far from the outermost outline. This enables bleeding to be effectively suppressed without impairing the background image.

Figure 8J:
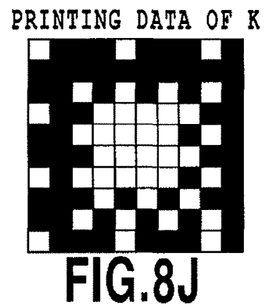
Figure 8K:
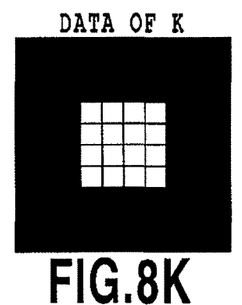

Finally, the logical AND of data obtained by inverting the K thinning data (FIG. 8I) and the K data 1104 (FIG. 8K) is calculated to generate printing K data 1105 shown in FIG. 8J. A similar process is also executed on C, M, and Y data to generate printing C data 1107, printing M data 1109, and printing Y data 1111.

For the thinning masks (1), (2), and (3), thinning amount may be varied among K, C, M, and Y. Thus, for example, the thinning amount can be set at a larger value for color inks that are likely to bleed.

As described above, the thinning ratio is reduced from the pixels located closest to the outermost outline of the outline character toward those located far from the outermost contour and is increased for the color ink that are likely to bleed. This enables printing of outline characters without degrading the fineness of the outline character, while effectively preventing bleeding and blurredness of the outline character.

Embodiment 3

An embodiment of the present invention includes a configuration in which the present invention is applied to printing of an image composed of a character and its background in any of various colors. That is, the third embodiment prevents possible bleeding in the boundary between a black character and a background color or between a colored character and a background color.

A process and a configuration for executing the process in accordance with the present embodiment are similar to those in accordance with Embodiment 1. A "character boundary thinning process" in accordance with the present embodiment is executed in the same manner as the outline character expanding process, described in Embodiment 1. The thinning process is executed at a thinning ratio of 100% as is the case with Embodiment 1.

Figure 9:
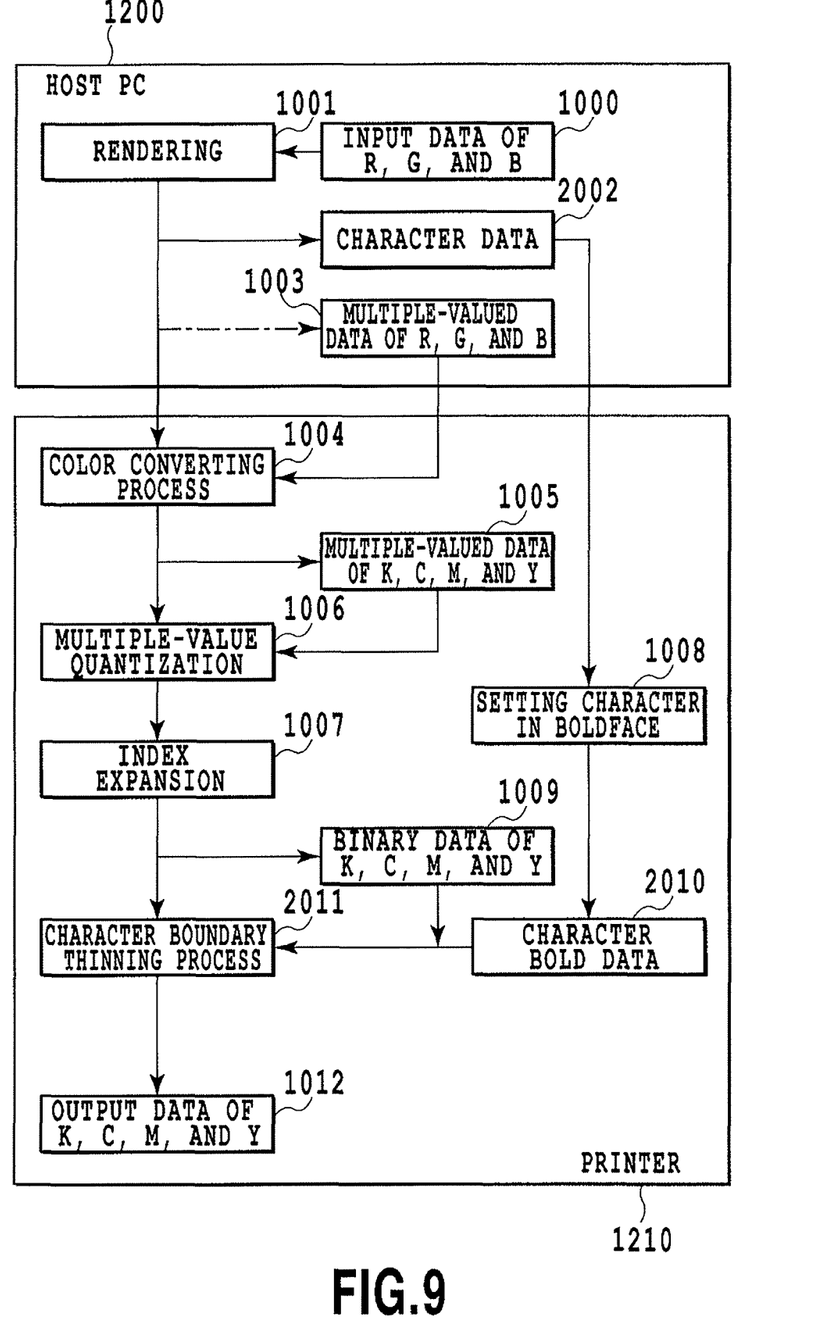
FIG. 9 is a block diagram showing a configuration that executes a character boundary thinning process in accordance with a third embodiment of the present invention.

FIG. 9 is a block diagram showing a configuration for executing a character boundary thinning process in accordance with the present embodiment. The configuration is substantially similar to that in accordance with Embodiment 1, shown in FIG. 4.

The difference from Embodiment 1 is extraction of character data 2002 of a predetermined color from the input data 1000, instead of extraction of outline character data in Embodiment 1. The present embodiment enables extraction of character data on all colors. The present embodiment further executes a character boundary thinning process 2011, instead of the outline character expanding process in Embodiment 1. However, a basic algorithm for the process is the same as that in Embodiment 1 as described below.

Character Boundary Thinning Process

FIGS. 10A to 10F are diagrams showing data generated and processed in the respective sequential steps of the outline character expanding process in accordance with the present embodiment.

Figure 10A:
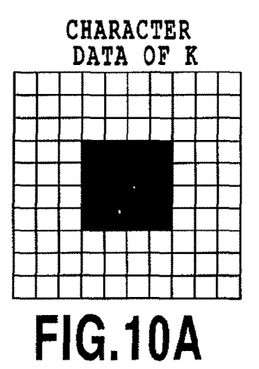
FIGS. 10A to 10F are diagrams showing data generated and processed in sequential steps of the character boundary thinning process.
Figure 10B:
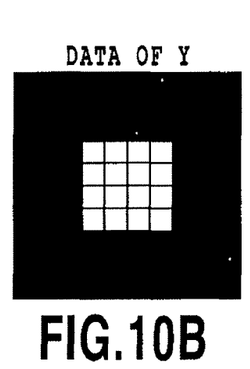
Figure 10C:
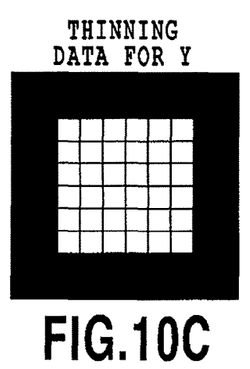

For bold K character data shown in FIG. 10A, data expanded to eight adjacent pixels is obtained and then the expanded data is inverted. The logical AND of the inverted expanded data and background Y data shown in FIG. 10B is calculated to generate Y thinning data shown in FIG. 10C.

Figure 10D:
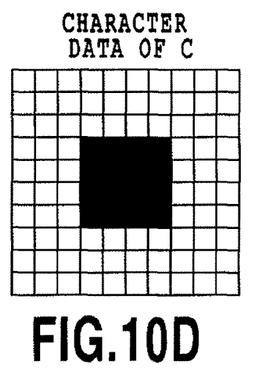
Figure 10E:
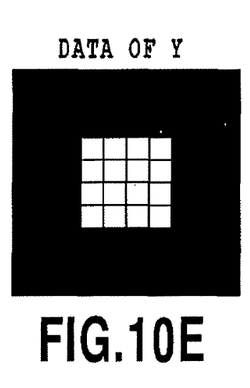
Figure 10F:
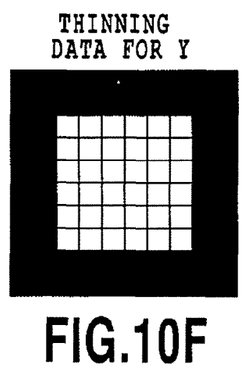

For bold cyan (C) character data shown in FIG. 10D, inverted expanded data is similarly obtained. The logical AND of the inverted expanded data and background Y data shown in FIG. 10E is calculated to generate Y thinning data shown in FIG. 10F.

As described above, by executing a character boundary process on the basis of data on a character in a predetermined color, it is possible to obtain an image with characters expanded between a black character and a background color or between a colored character and a background color. Thus, even if ink used to print a character or background bleeds, the bleeding ink can be collected in the expanded area, reducing the mixture of inks. This makes it possible to improve the visibility of printed characters while preventing possible bleeding between the character and background.

Additionally, thinning masks may be applied to Embodiment 3 as is the case with Embodiment 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-119646, filed Apr. 24, 2006, which is hereby incorporated by reference herein in its entirety.

What is claimed is:

1. An ink jet printing apparatus, comprising:
   a print head adapted to eject ink to a print medium to perform printing according to print data;
   a generating unit configured to generate the print data by thinning out a first region of image data, the first region being adjacent to a contour of a character and being located outside of the contour of the character, with the character being, composed of pixels to which ink is not ejected, and without thinning out a second region of the image data, the second region being located outside the contour of the character, where a distance from the contour of the character to the second region is greater than a distance from the contour of the character to the first region; and
   a control unit configured to cause the print head to perform a printing operation based on the print data generated by the generating unit.

2. The ink jet printing apparatus according to claim 1, further comprising:
   a discriminating unit configured to discriminate character data and image data, corresponding to the first region, from inputted image data.

3. The ink jet printing apparatus according to claim 2, wherein the inputted image data is composed of the character data and the image data.

4. The ink jet printing apparatus according to claim 1, wherein the generating unit thins out the image data corresponding to all pixels composing the first region to generate the print data.

5. The ink jet printing apparatus according to claim 1, wherein among pixels composing the first region, a thinning ratio for a first pixel group composed of a plurality of pixels that are all positioned a first distance from the contour of the character is higher than a thinning ratio for a second pixel group composed of a plurality of pixels that are all positioned a second distance from the contour of the character, the second distance being longer than the first distance.

6. The ink jet printing apparatus according to claim 1, wherein the generating unit thins out the image data corresponding to the first region according to mask data for thinning only the image data of the pixels composing the first region among the image data to generate the print data.

7. The ink jet printing apparatus according to claim 1, wherein thinning ratios for ink colors, at which the image data of the pixels composing an adjacent region is thinned out, are different from each other.

8. The ink jet printing apparatus according to claim 1, wherein the generated print data includes character data of the character.

9. The ink jet printing apparatus according to claim 1, wherein the image data excludes the character data.

10. The ink jet printing apparatus according to claim 1, wherein all of the pixels composing the character are pixels showing white.

11. An image processing method of generating print data used for causing a print head to eject ink to a print medium to perform printing, the method comprising:
    a generating step of generating the print data by thinning out a first region of image data, the first region being adjacent to a contour of a character and located outside of the contour of the character, with the character being composed of pixels to which ink is not ejected, and without thinning out a second region of the image data, the second region being located outside of the contour of the character, where a distance from the contour of the character to the second region is greater than a distance from the contour of the character to the first region; and
    a control step of causing the print head to perform a printing operation based on the print data generated in the generating step.

12. The ink jet printing method according to claim 11, further comprising:
    a discriminating step of discriminating character data and image data, corresponding to the first region, from inputted image data.

13. The image processing method according to claim 12, wherein the inputted image data is composed of the character data and the image data.

14. The ink jet printing method according to claim 11, wherein the generating step thins out the image data corresponding to all pixels composing the first region to generate the print data.

15. The ink jet printing method according to claim 11, wherein among pixels composing the first region, a thinning ratio for a first pixel group composed of a plurality of pixels that are all positioned a first distance from the contour of the character is higher than a thinning ratio for a second pixel group composed of a plurality of pixels that are all positioned a second distance from the contour of the character, the second distance being longer than the first distance.

16. The ink jet printing method according to claim 11, wherein the generating step thins out the image data corresponding to the first region according to mask data for thinning only the image data of the pixels composing the first region among the image data to generate the print data.

17. The ink jet printing method according to claim 11, wherein thinning ratios for ink colors, at which image data of the pixels composing the adjacent region are thinned out, are different from each other.

18. The image processing method according to claim 11, wherein the generated print data includes character data of the character.

19. The image processing method according to claim 11, wherein the image data excludes the character data.

20. The image processing method according to claim 11, wherein all of the pixels composing the character are pixels showing white.

21. An ink jet printing apparatus, comprising:
    a print head adapted to eject ink to a print medium to perform printing according to print data;
    a generating unit configured to generate the print data by thinning out a predetermined region of image data, the predetermined region being adjacent to a contour of a character and being located outside of the contour of the character, with the character being composed of pixels to which ink is not ejected;
    wherein among pixels composing the predetermined region, a thinning ratio for a first pixel group composed of a plurality of pixels that are positioned a first distance from the contour of the character is higher than a thinning ratio for a second pixel group composed of a plurality of pixels that are positioned a second distance, longer than the first distance, from the contour of the character, and
    a control unit configured to cause the print head to perform a printing operation based on the print data generated by the generating unit.

22. The ink jet printing apparatus according to claim 21, wherein the generating unit generates the print data by thinning out all of the pixels composing the first region.

23. The ink jet printing apparatus according to claim 21, wherein thinning ratios for ink colors, at which the image data of the pixels composing an adjacent region is thinned out, are different from each other.

24. The ink jet printing apparatus according to claim 21, wherein all of the pixels composing the character indicate white color.

25. An ink jet printing method for printing an image by ejecting ink on a print medium from the print head, comprising:
- obtaining image data;
- generating print data by thinning out a predetermined region of the image data, the predetermined region being adjacent to a contour of a character and being located outside of the contour of the character, with the character being composed of pixels to which ink is not ejected;
- wherein among pixels composing the predetermined region, a thinning ratio for a first pixel group composed of a plurality of pixels that are positioned a first distance from the contour of the character is higher than a thinning ratio for a second pixel group composed of a plurality of pixels that are positioned a second distance, longer than the first distance, from the contour of the character, and
- controlling the print head to perform a printing operation based on the generated print data.

26. A data generating method for generating print data to print an image by applying ink to a print medium, comprising:
- obtaining image data corresponding to the image including a character; and
- generating the print data by thinning out a predetermined region of the image data, the predetermined region being adjacent to a contour of the character and being located outside of the contour of the character, with the character being composed of pixels to which ink is not ejected;
- wherein among pixels composing the predetermined region, a thinning ratio for a first pixel group composed of a plurality of pixels that are positioned a first distance from the contour of the character is higher than a thinning ratio for a second pixel group composed of a plurality of pixels that are positioned a second distance, longer than the first distance, from the contour of the character.

27. The data generating method according to claim 26, wherein all of the pixels composing the first region are thinned out in the generating step.

28. The data generating method according to claim 26, wherein all of the pixels composing the character indicate white color.

29. A data generating apparatus for generating print data to print an image by applying ink to a print medium, comprising:
- an obtaining unit configured to obtain image data corresponding to the image including a character; and
- a generating unit configured to generate the print data by thinning out a predetermined region of the image data, the predetermined region being adjacent to a contour of the character and being located outside of the contour of the character, with the character being composed of pixels to which ink is not ejected;
- wherein among pixels composing the predetermined region, a thinning ratio for a first pixel group composed of a plurality of pixels that are positioned a first distance from the contour of the character is higher than a thinning ratio for a second pixel group composed of a plurality of pixels that are positioned a second distance, longer than the first distance, from the contour of the character.

* * * * *